United States Patent
Naubert et al.

(10) Patent No.: US 9,506,543 B2
(45) Date of Patent: Nov. 29, 2016

(54) ELECTROMECHANICALLY CONTROLLED DECOUPLING DEVICE FOR ACTUATORS

(71) Applicant: Airbus Defence and Space GmbH, Ottobrunn (DE)

(72) Inventors: Alexander Naubert, Stuttgart (DE); Markus Christmann, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 275 days.

(21) Appl. No.: 14/469,321

(22) Filed: Aug. 26, 2014

(65) Prior Publication Data

US 2015/0060602 A1  Mar. 5, 2015

(51) Int. Cl.
| | | |
|---|---|---|
| *F16H 25/20* | (2006.01) | |
| *B64C 13/50* | (2006.01) | |
| *B64C 13/42* | (2006.01) | |
| *F16H 25/22* | (2006.01) | |

(52) U.S. Cl.
CPC ........... *F16H 25/2025* (2013.01); *B64C 13/42* (2013.01); *B64C 13/50* (2013.01); *F16H 25/205* (2013.01); *F16H 25/2204* (2013.01); *F16H 2025/2081* (2013.01); *Y02T 50/44* (2013.01)

(58) Field of Classification Search
CPC ............. F16H 25/2204; F16H 25/205; F16H 25/2025; F16H 2025/2081; B64C 13/50; B64C 2700/6263; B64C 2700/6257
See application file for complete search history.

(56) References Cited

U.S. PATENT DOCUMENTS

| | | | |
|---|---|---|---|
| 7,190,096 B2 * | 3/2007 | Blanding | ............... B64C 13/00 310/112 |
| 2002/0134180 A1 * | 9/2002 | Gorin | ................. F16H 25/2015 74/89.37 |

* cited by examiner

*Primary Examiner* — Brian M O'Hara
(74) *Attorney, Agent, or Firm* — Crowell & Moring LLP

(57) ABSTRACT

An aircraft includes an electromechanical actuator and a decoupling device. A form-fit between a drive element and a linkage point outside of the actuator element can be reversibly decoupled and recoupled. The decoupling device allows the actuator element to run freely in the event of a malfunction, which effectively prevents a jam.

17 Claims, 7 Drawing Sheets

ELECTROMECHANICALLY CONTROLLED DECOUPLING DEVICE FOR ACTUATORS

CROSS-REFERENCE TO RELATED APPLICATIONS

This application claims priority under 35 U.S.C. §119 to European Patent Application 13004215.3-1752, filed Aug. 27, 2013, the entire disclosure of which is herein expressly incorporated by reference.

BACKGROUND AND SUMMARY OF THE INVENTION

Exemplary embodiments of the present invention relate to aviation technology. In particular, exemplary embodiments of the present invention relate to actuator technology for aerodynamically active elements of an aircraft. Furthermore, exemplary embodiments of the present invention relate to an actuator element with a reversible decoupling device, an actuator arrangement as well as an aircraft, particularly an airplane or helicopter.

Actuators are used in aircraft to mechanically move aircraft elements and to change their position or location. For airplanes, these are for example rudder surfaces or wing elements to influence the lift behavior of the airplanes. For helicopters, this can pertain for example to the various rotor blade positions by means of a swashplate.

Such actuators are conventionally designed as hydraulic elements, since this technology has been mastered for a long time and is less prone to faults. In the event of a malfunction, conventional hydraulic actuators can usually still be moved; in other words, they are not jammed in the event of a malfunction.

Due to the increased electrification of aircraft, it is desired to replace hydraulic actuators, which possibly require a hydraulic system running throughout the entire aircraft, with electric actuators. These can be supplied in a purely electrical manner, wherein such electrical lines are normally simpler to install and maintain in an aircraft than hydraulic lines. In addition, the electrical transmission of power or energy makes a weight decrease possible compared to a hydraulic system. Generating movement by such an electric actuator can now also be executed solely electrically, for example using a suitable drive by means of an electric motor; or however, a local hydraulic system can be provided at the actuator, particularly a hydraulic system arranged in the actuator system, the hydraulic system having to also be supplied with electrical energy only from the outside.

Figure 1A:
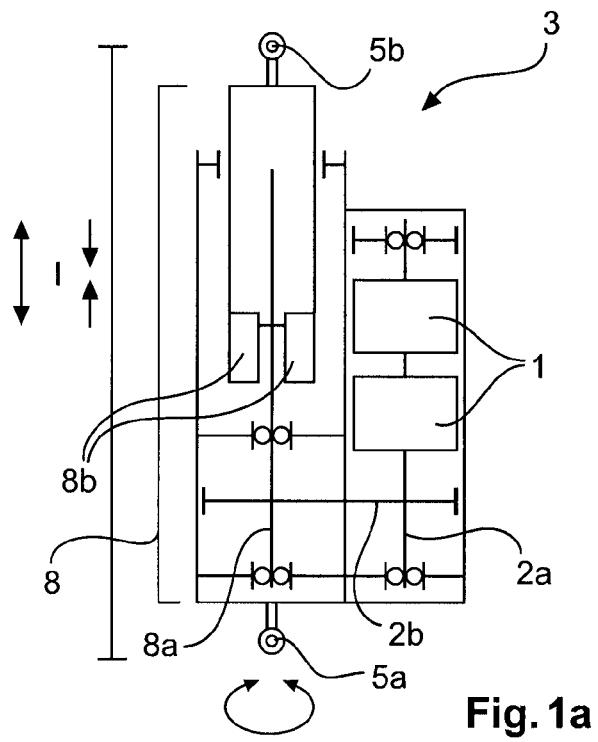

FIG. 1a depicts a schematic illustration of an electromechanical actuator.

As illustrated in this example, two motor elements 1 are linked to drive unit 8 of actuator element 3, using a suitable linkage consisting of a motor shaft 2a and a suitable transmission 2b. Drive unit 8 is changeable in its length I, particularly in its distance between the two linkage points 5a,b, so that a length change of drive unit 8 of actuator element 3 modifies the distance between linkage points 5a,b. By means of a suitable restraint between elements, a moving or tilting of an aerodynamically active structure is possible. Drive unit 8 consists of a first drive element 8a and a second drive element 8b, constructed, for example, as a ball screw drive 8 with a ball nut 8b and a ball spindle 8a. By rotating ball spindle 8a, ball nut 8b can be displaced on it, so that the rotation of ball spindle 8a provides a length change of drive unit 8 and thus of actuator element 3 or a change in the distance between linkage points 5a,b. In the event of a defect of an actuator element, particularly for mission-critical aerodynamically active surfaces, one must ensure that these can at least still be moved despite the defect. In the event that an actuator element fails, depending on actual use, usually a certain redundancy is provided. In the case of tail units or rudders, a second actuator element can be arranged in a force-parallel manner to the first one for example so that the position change of the aerodynamically active surface can be detected by one of the two actuator elements or also by both together.

Now should an actuator element of the two parallel actuator elements fail, then the other one can at least maintain the function. However, particularly relevant in this context are defects of actuator elements that subsequently no longer allow a length change to be executed; for example the breaking of the ball of the ball screw drive can possibly jam the ball spindle and the ball nut against each other so that a length change of the actuator element is no longer possible. In such a case, control of the aerodynamically active surface can also not be executed by the parallel-arranged actuator element. In a worst case scenario, the aircraft would thus no longer be controllable and would possibly crash. To keep electromechanically actuator elements changeable in their length at least by an external force, including in a malfunction situation, decoupling devices or decoupling mechanisms can be integrated into the actuator elements, which remove the blockage in a malfunction by decoupling the jammed actuator element and thereby ensure that the aerodynamically active surface remains movable and controllable by the force effect of the parallel-arranged element.

Figure 1B:
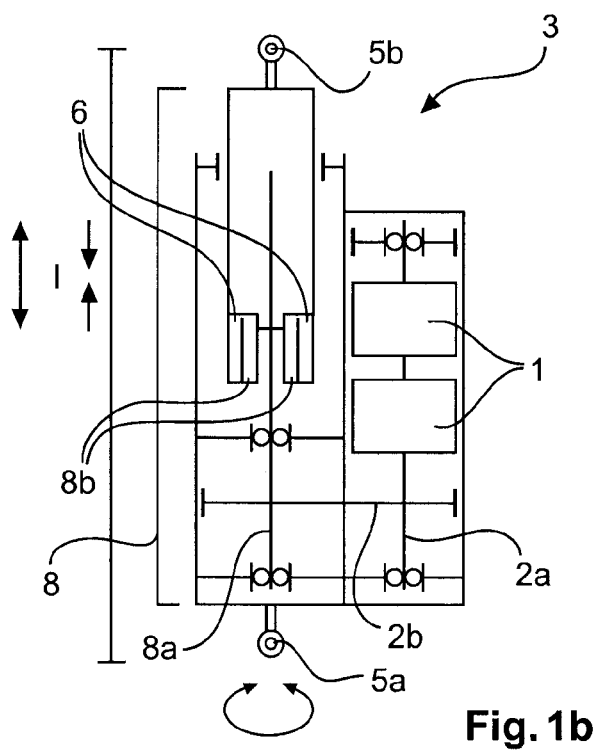

FIG. 1b depicts an example of such an actuator element. Ultimately, the embodiment of FIG. 1b differs from FIG. 1a only by the provision of a decoupling device 6. Decoupling device 6 thereby not only decouples the two drive elements 8a,b from each other; instead, a decoupling is undertaken in such a manner that a decoupling of the contact points 5a,b results, wherein one of the contact points is also essentially connected in a decoupled state with both drive elements of the drive unit, while the connection of a drive element to the second contact point 5b is released. The length of an actuator element can hereby change regardless whether a mechanism of the drive unit, for example the first drive element 8a to the second drive element 8b, is jammed.

One aspect of the present invention provides a special design of a reversible decoupling device for an electromechanical actuator element.

According to a first embodiment of the present invention, an actuator element has a drive unit with a first drive element and a second drive element, wherein the first drive element and the second drive element functionally interact in such a manner to effect a change in length of the actuator element, wherein the actuator element has a decoupling device, wherein the actuator element has two linkage points, whose span can be set by the length change of the actuator, wherein one of the drive elements is connected in an essentially direct-action manner with the other linkage points, wherein the span of the two linkage points in a coupled state of the decoupling device can be adjusted by the actuator element and wherein the span of the two linkage points in the decoupled state of the decoupling device can be changed by subjecting the linkage points to an external force. The decoupling device has a decoupling mechanism with a drive element, a form-fitting element, and a retaining element, wherein the retaining element is set up to take a first position in which the form-fitting element is in a closed state, and wherein the retaining element is set up to assume a second position in which the form-fitting element is in an open state.

The drive element is set up to displace the retaining element between the first position and the second position, whereby the form-fit of the form-fitting element can be reversibly released and fixed, wherein the decoupling mechanism functionally decouples the output piston from a drive element of the actuator element in such a manner that the change in length of the actuator element is made possible independent of the drive unit, particularly without any functional decoupling of the first drive element and second drive element.

According to another embodiment of the present invention, an actuator arrangement includes at least two actuator elements according to the present invention, wherein the at least two actuator elements are arranged in a force-parallel manner so that a length change of the actuator arrangement can be effected by an actuator element alone or by both actuator elements simultaneously.

According to another embodiment of the present invention, an aircraft, particularly an airplane or helicopter, includes an actuator arrangement according to the present invention and/or an actuator element according to the present invention.

Conventional actuator elements for actuating aerodynamically active elements have either no decoupling device or one that possibly provides only an irreversible decoupling or a decoupling that can only be re-coupled with great effort. Since electromechanical actuator elements with a decoupling device that control aerodynamically active elements may involve mission-critical elements, which in a malfunction could possibly result in the aircraft crashing, regular testing of a decoupling device and thus the simulation of the malfunction is desirable to ensure correct operation in the event of a malfunction. Electromechanical actuator elements, which cannot be re-coupled with little effort are thus possibly not testable at periodic intervals. It cannot be assured that a conventional decoupling device functions properly in an emergency, thereby ensuring that the flyability of an aircraft is maintained.

In contrast to this, the present invention provides an actuator element with a decoupling device, which after actuation can be transferred back into a coupled state in a simple manner. An actuator with such a reversible decoupling device can now be regularly inspected for proper functioning, for example during a comprehensive test prior to operating an aircraft. During the test, the decoupling device can thus be triggered under load the actuator element can thus be decoupled, whereby the worst-case scenario of the flight operation can be reconstructed. At the end of the test run, the still function-capable actuator element can simply be re-coupled and thereby makes its normal operating mode available.

Thus, according to the present invention an output piston is coupled with a drive unit of the actuator element in such a manner that the output shaft is connected in a form-fitting manner to a drive element of the drive unit. This represents the normal operating mode. The drive unit has a first drive element and a second drive element, which functionally interact in such a manner that the drive unit can provide a length change of the actuator element. The form-fitting coupling of the output piston to one of the drive elements provides for the length change of the actuator element. The two linkage points of an actuator element, which ultimately represent the effective length of the actuator element, can thus be arranged on the output piston on the one hand and on the actuator element itself on the other, for example on its housing. Thus, a linkage point is rigidly connected to the housing of the actuator element, while the second linkage point is linked via the output piston and is thereby connected to the drive unit. The output piston can be subjected to a translation movement, whereby the actuator element can be adjusted in its length.

In a coupled state of the decoupling device, the output piston is now connected to the drive unit or a drive element of the same in a form-fitting manner. In the event of a malfunction or decoupling, the form-fit between the output piston and the drive element of the drive unit may be released. In this way, the actuator element may experience a decoupling from the drive unit and output piston so that the length of the actuator element can be adjusted from the outside by means of a comparatively small amount of supplied power. In the event of a malfunction, in which the actuator element is thus decoupled, this, despite its defect, does not represent a jammed device, which could possibly lead to a negative influence on the controllability of an aircraft.

Such actuator elements are usually provided in the form of an actuator arrangement, which provides for a certain redundancy for controlling or positioning aerodynamically active elements. For example, two actuator elements can be arranged in a force- or effect-parallel manner so that the position and orientation of the aerodynamically active element can be separately effected by each of the actuator elements or however these may interact, whereby a force can be applied by both actuator elements. In the event of a malfunction, i.e., in the event that one of the actuator elements has a defect and is no longer able to function, or in a worst case scenario jammed so that a length change is no longer possible, the decoupling device according to the invention can decouple the actuator element in such a manner that a length change of the actuator element can be effected by an externally applied force. In this case, the defective actuator element could be decoupled and thereby does not represent any restriction regarding the controllability of the aerodynamically effective element for the parallel-arranged second actuator element, besides a slight amount of force expended for changing the length of the defective actuator element. In this way, the controllability of the aerodynamically active surface can continue to remain assured, despite the worst-case scenario of a jamming defect of one of the two actuator elements arranged in an effect- or force-parallel manner.

According to a preferred embodiment of the present invention, the drive unit may be designed as a ball screw drive, wherein the first drive element and the second drive element may be designed as a ball spindle and ball nut of the ball screw drive. For adjusting the length change of an actuator element, there are various implementation possibilities. Usually in the aviation segment, a configuration as ball screw drive or roller screw drive is selected, since these are comparatively robust and can transfer large forces in a low-friction and low-wear manner. A ball screw drive thereby normally consists of a spindle as well as a ball nut. Various implementations provide for the moving and rotating of the ball spindle, while a ball nut, secured against rotation, is displaced on the ball spindle. Another embodiment provides for the ball nut to rotate, while the ball spindle thereby completes a translation parallel to the axis of rotation.

According to another preferred embodiment of the present invention, the actuator element may also have a motor element, wherein the ball nut can be rotated when using the motor element, by means of which a length change of the actuator element can be executed through the translation of the ball spindle. According to another preferred embodiment of the present invention, the form-fitting element can be engaged with the output piston in a form-fitting manner so that the translation of the ball spindle causes a translation of the output piston. The present invention pertains particularly to an embodiment in which the ball nut rotates, while the ball spindle moves in a translational manner and the length of the actuator element is hereby adjusted. For a preferred decoupling of the drive elements of the drive unit, the decoupling device shall not undo the drive elements themselves if possible since this can possibly not be assured at all times, particularly in the event of a ball screw drive or planetary roller screw drive. To this end, a linkage point is connected to the drive unit, a second linkage point is connected via another element to the other drive element, while the decoupling device or the decoupling mechanism decouples a linkage, particularly a form-fitting one, of a drive element and another element to the linkage point in such a manner that a length-changing capability can be assured by means of an external force on the actuator element in a decoupled state, even if the first drive element and the second drive element are completely jammed, by undoing the connection between the drive element and other element. The decoupling device or the decoupling mechanism can thus be displaced preferably between a first state, a closed state in which the form-fitting element is closed, and a second state, an open state in which the form-fitting element has a released form-fit.

According to another preferred embodiment of the present invention, the spindle may be constructed as a hollow spindle, wherein the output piston is arranged inside the spindle. The actuator element of the present invention thus has a drive unit with a ball screw drive, particularly a rotating spindle nut, and a translationally moved spindle, to which an output piston is connected in a form-fitting manner using the decoupling mechanism, wherein the second linkage point is arranged on the output piston. The spindle can thus be constructed as a hollow spindle for example, in whose interior space the output piston is arranged. Without a form-fit of the form-fitting element, the output piston may essentially be freely displaceable inside the spindle, while the output piston in the form-fitted state of the form-fitting element is rigidly connected to the spindle and moves translationally with the spindle when the spindle nut rotates. In a form-fit-released stated, the output piston can be displaced with comparatively little force inside the spindle.

According to another preferred embodiment of the present invention, a form-fit may be provided in the first position of the retaining element between the output piston and the spindle, while in the second position of the retaining element, the form-fit between the output piston and the spindle is released and the output shaft can essentially be freely displaced inside the spindle. In this way, the retaining element enables one to simply switch between a form-fitting state and a non-form-fitting stated of the form-fitting element. The retaining element together with the form-fitting element thereby preferably does not act in the same force direction that may act on the actuator element due to a lengthening or shortening. Particularly preferred is the exertion of a force of the retaining element on the form-fitting element for providing the form-fit essentially vertically to the force provided by the actuator element based on its lengthening or shortening. The force provided by the retaining element can hereby essentially restrict itself to maintaining the form-fit and must not simultaneously be configured in such a stable manner as to resist the force, which the actuator element applies during lengthening or shortening. In this way, the force of the retaining element is decoupled from the force of the actuator element.

According to another preferred embodiment of the present invention, the form-fitting element may be constructed as a plurality of ball elements, wherein the output piston has recesses corresponding to the ball elements, wherein the retaining element is constructed as a sleeve element with recesses, wherein the sleeve element can be rotated using the drive element of the decoupling mechanism, wherein the sleeve element is set up in the first position to retain the ball elements in the recesses of the output piston to provide the form-fit between the output piston and spindle, and wherein the sleeve element is set up in the second position to accommodate the ball elements in the recesses of the sleeve element, so that the form-fit is released. The form-fitting elements can thus be displaced between a first, form-fitting position in which they are arranged in the recesses of the output piston and a second form-released position in which they are arranged in the recesses of the sleeve element. The sleeve element may thus execute a comparatively minor rotation and essentially be pivoted between a position in which the recesses of the sleeve element align with the form-fitting elements and a position in which the form-fitting elements are pressed or retained in the corresponding recesses of the output piston. A preferred release under load of the form-fit is hereby also possible, since due to the design of the form-fitting elements as ball elements, no jamming surfaces can occur. As soon as the recesses of sleeve element align with the ball elements, the latter are pressed, due to the form of the ball surface, out of the corresponding recesses of the output piston into the recesses of the sleeve element, and release the form-fit.

According to another preferred embodiment of the present invention, the actuator element may also have a housing and a sealing element arrangement, wherein the sealing element arrangement is set up in such a manner that the region of the form-fitting element, retaining element, output piston, and housing are essentially designed in a sealed manner so that in particular the region can be filled with a suitable lubricant. By means of such an arrangement, friction in the decoupling mechanism may be further reduced so that the actuation force of the decoupling mechanism is comparatively low. By means of the sealed design of the region of the sealing element arrangement, the latter may also be designed in an essentially maintenance-free manner.

According to another preferred embodiment of the present invention, the actuator element may also have rod seals, wherein when using the rod seals, a sealing effect is essentially provided for the lubricant also during a test. In this way, a test of the decoupling device can be repeatedly performed without possibly risking a function impairment in the event of a malfunction.

According to another preferred embodiment of the present invention, one of the linkage points may be arranged on a housing end of the actuator, while the other linkage point is arranged on the external end of the output piston. In this way, the two linkage points, which form the effective length of the actuator element, are arranged on opposite ends of the actuator element, while a simple decoupling of the output piston and elements provided in the actuator element, such as individual drive elements, can continue to be provided by the decoupling device or the decoupling mechanism.

According to another preferred embodiment of the present invention, the decoupling device may be decouplable in the course of a test and be re-couplable after completion of the test. A cyclic function test regarding the emergency coupling of the actuator element may hereby be performed and it may in particular be assured that the actuator element or its decoupling device can execute and not block a decoupling, even in a critical malfunction during flight.

According to another preferred embodiment of the present invention, the decoupling device may actuate the decoupling mechanism of the actuator element in the event of a defect of a drive unit or the ball screw drive or planetary roller screw drive of an actuator element, so that the actuator element is functionally decoupled, wherein the length change of the actuator arrangement can still be effected by the non-decoupled actuator element. The decoupling device according to the invention thereby ensures that the displaceability of an actuator element is assured from the outside even in the event of a fault, in a worst-case scenario in the event of the first and second drive elements jamming each other, so that the remaining, redundant, parallel-arranged second actuator element can continue to adjust the aerodynamically active element without being negatively influenced by the defective actuator element.

According to another preferred embodiment of the present invention, a conductive connection between the decoupling device and an aircraft can be routed solely to the stationary part of the decoupling device, so that a movement of the moveable part of the decoupling device does not require any movability of the conductive connection. By means of the mechanical transfer of the rotation through the pivoting sleeve from the stationary to the moveable part of the decoupling device or the element, all connections of the element, particularly including all connections of the decoupling device, each comprising connections for power transmission as well as for transmitting sensor signals from/to associated controllers/monitoring units can be attached in the stationary part of the element. In this way, one does away with the need for a special design of the cable harness for compensating for any relative motion that would be associated with additional effort, costs, and potentially reduced reliability.

BRIEF DESCRIPTION OF THE DRAWING FIGURES

Further details regarding the embodiments of the invention are addressed below using the attached drawings.

Figure 2:
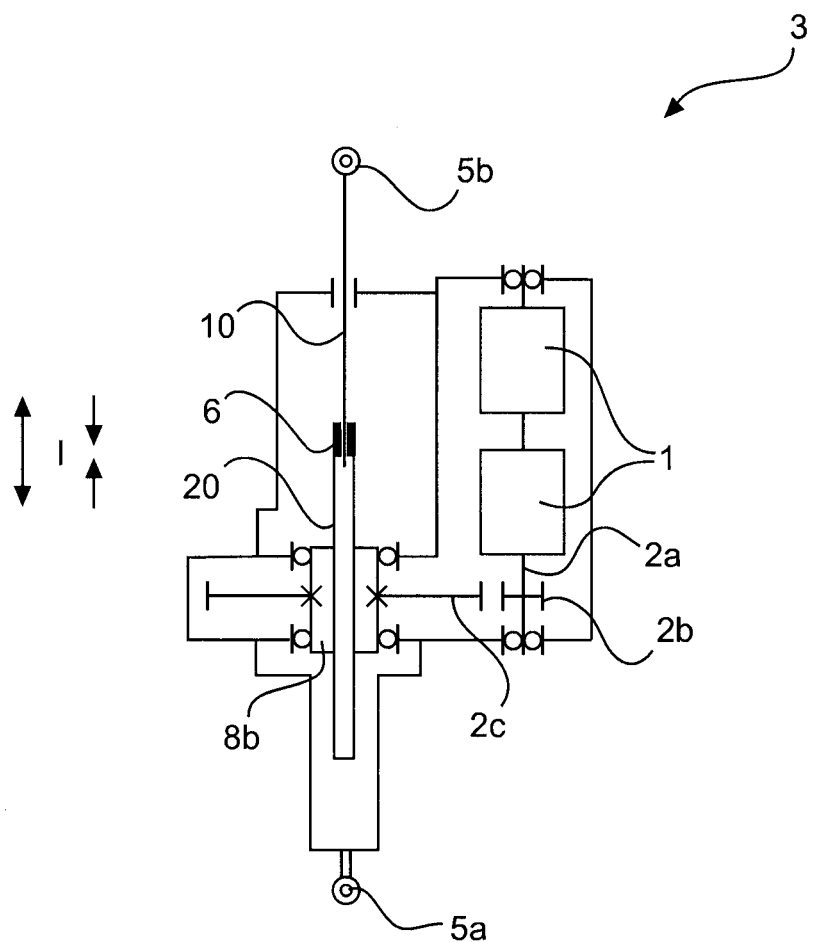
Figure 3A:
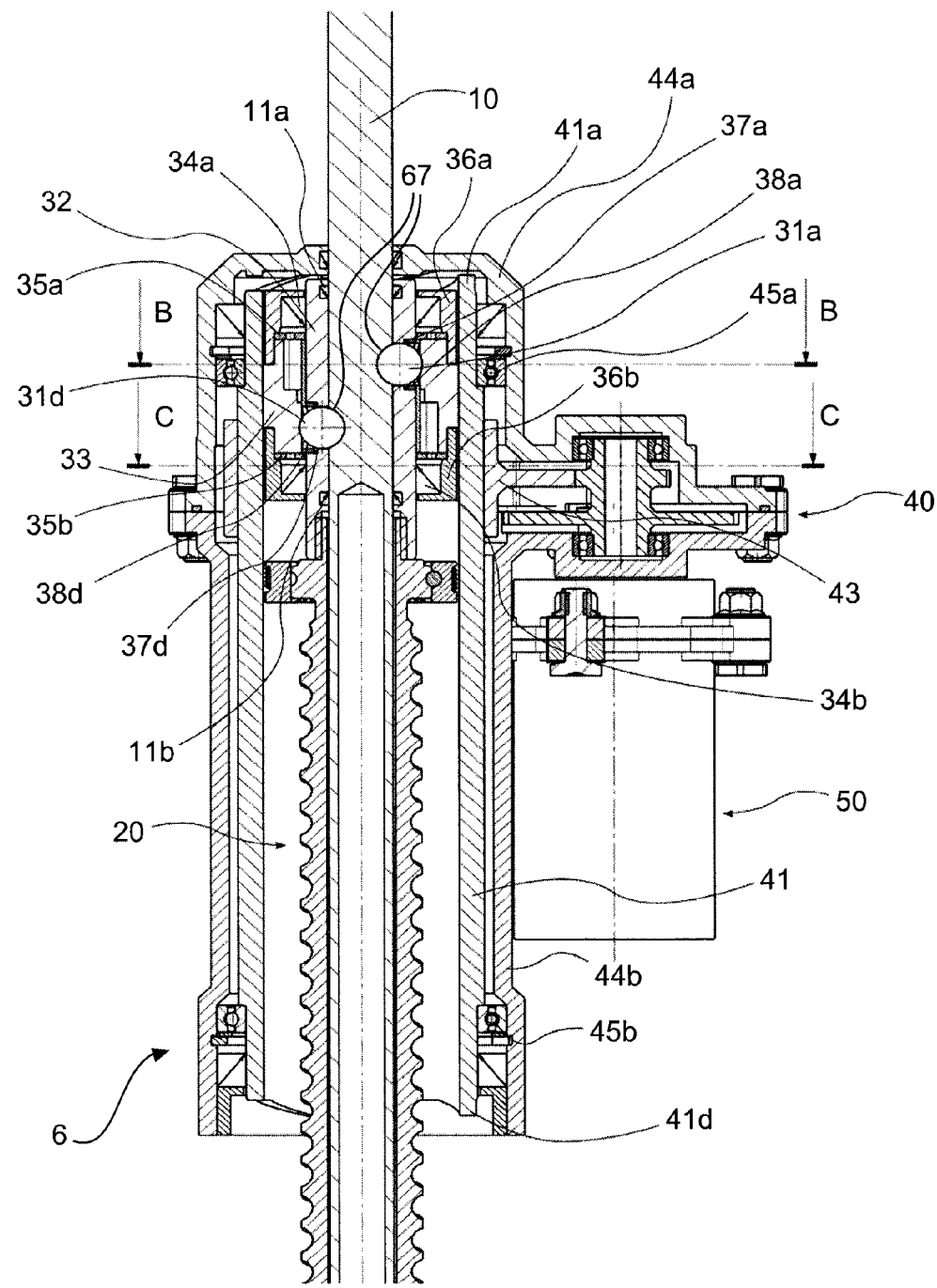
Figure 3B:
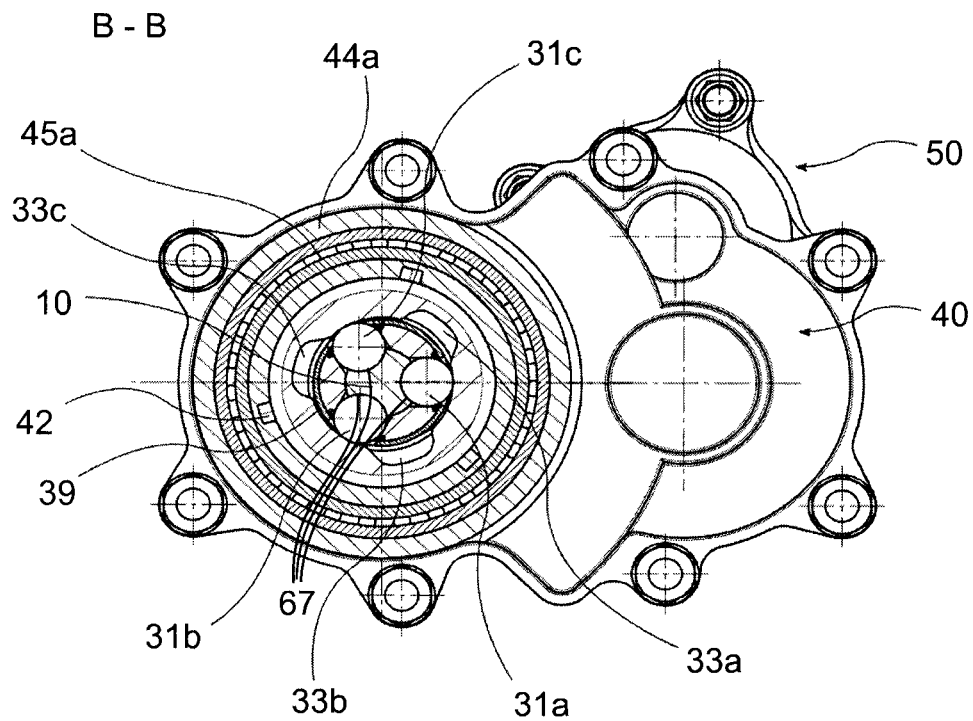
Figure 3C:
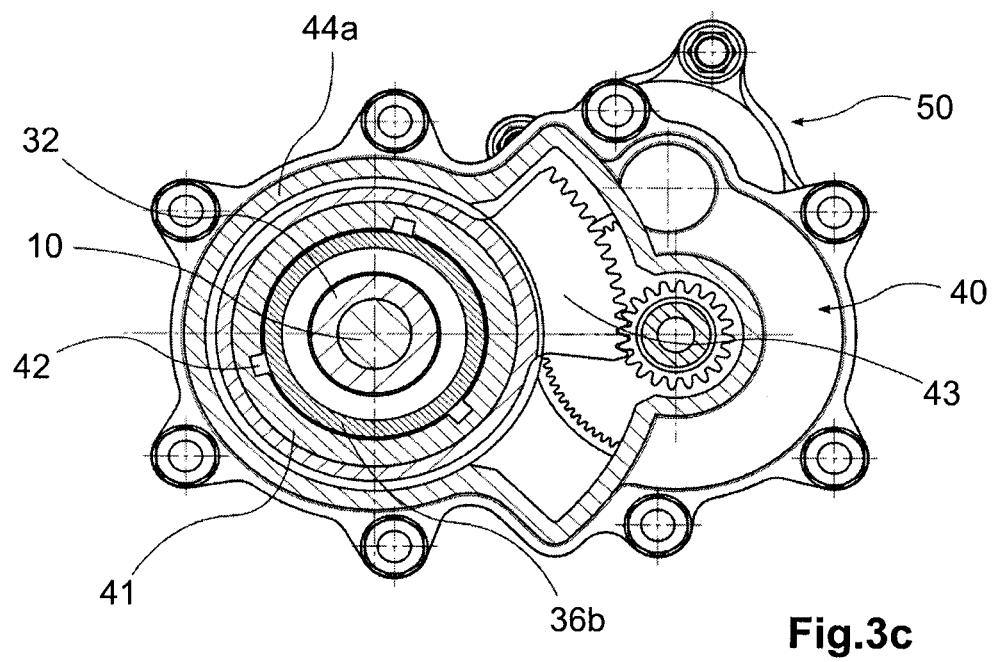
Figure 4A:
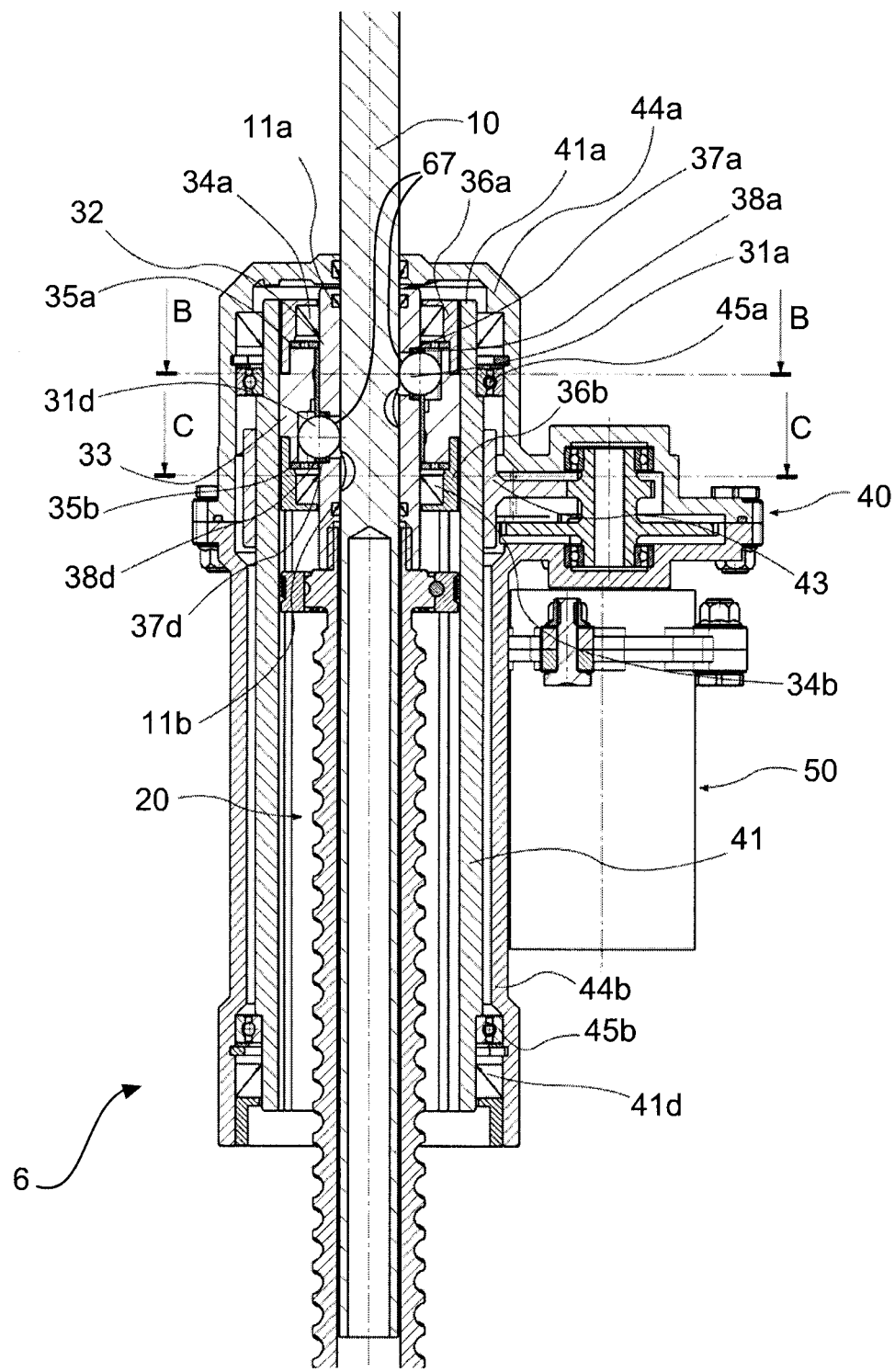
Figure 4B:
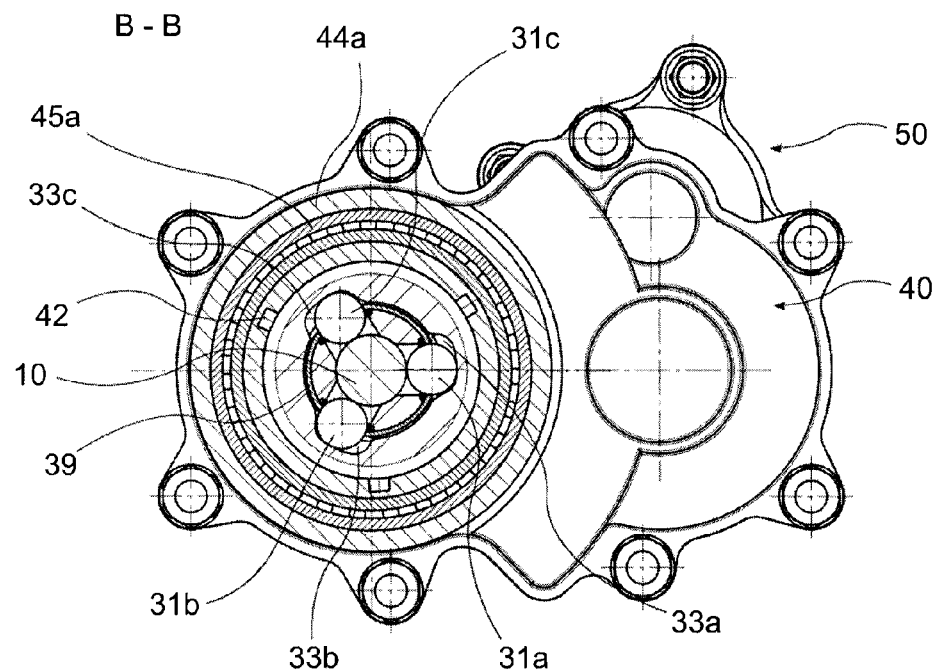
Figure 4C:
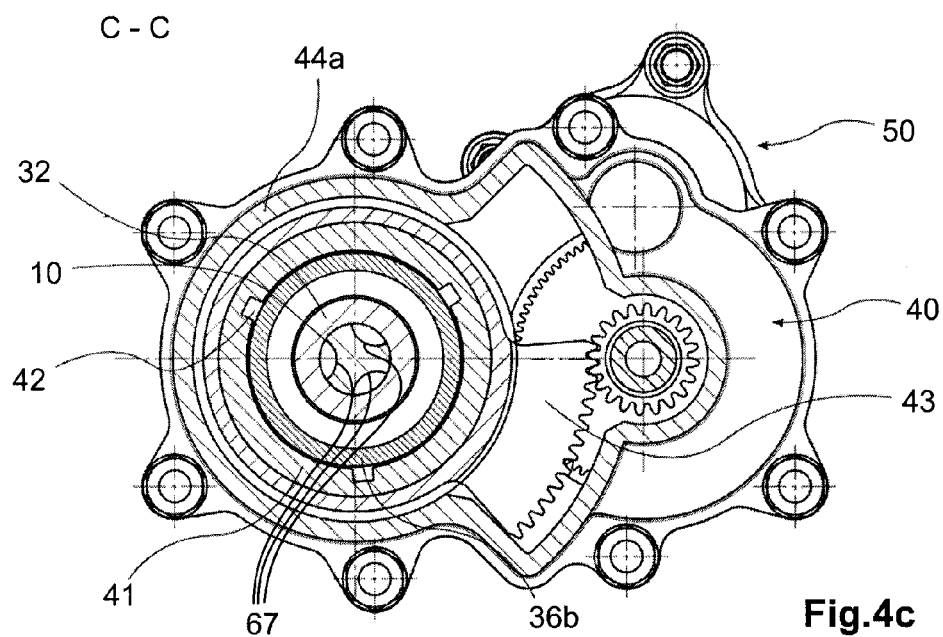
Figure 5:
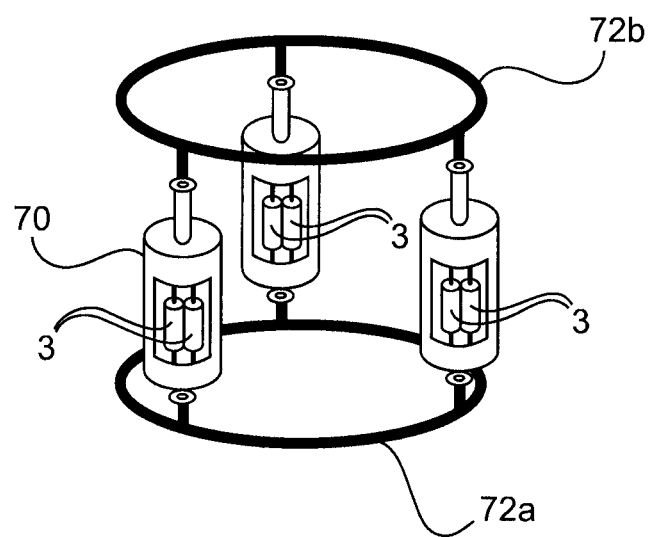

FIG. 1a,b depicts a schematic illustration of an electromechanical actuator;

FIG. 2 depicts a schematic illustration of an electromechanical actuator according to the present invention;

FIG. 3a-c depicts an exemplary embodiment of the decoupling device according to the present invention in a locked, form-fitting state;

FIG. 4a-c depicts an exemplary embodiment of the decoupling device according to the present invention in an open state; and FIG. 5 depicts an exemplary embodiment of an actuator arrangement according to the present invention.

DETAILED DESCRIPTION

FIG. 2 is a schematic illustration of an electromechanical actuator according to the present invention. Specifically, FIG. 2 depicts a schematic design of an electromechanical actuator 3, for example to control the primary flight control elements for helicopters. By way of example, two motor elements 1 are provided here that are connected using motor shaft 2a and a suitable transfer 2b,c to the second drive element 8b, constructed as a rotating ball nut of a ball screw drive. Actuator element 3 is modifiable or adjustable in its length l, particularly between the two linkage points 5a,b so that a length change of actuator element 3 changes the distance between linkage points 5a,b. Ball nut 8b is schematically depicted as a rotating element, whereby the first drive element 20, for example a ball spindle, moves upward or downward in the rotating ball nut 8b in FIG. 2. Ball spindle 20 itself is secured against rotation, for example by providing an anti-rotation element that is installed, for example, at the lower end of drive spindle 20. The lower linkage point 5a can for example be attached to a suitable aircraft structure, while the upper linkage point 5b can be attached on the swashplate of a helicopter.

During normal operation, output piston 10 is rigidly connected to ball spindle 20, particularly in a form-fitting manner. Such a rigid or form-fitting connection may be provided by decoupling device 6. During normal operation, ball nut 8b rotates, and hereby ball spindle 20, as well as output piston 10 by the form-fitting link to output piston 10, is displaced parallel to the axis of rotation of the spindle nut, whereby actuator element 3 is lengthened or shortened, so that the distance of linkage points 5a,b is influenced. In the event that a mechanical defect in the drive unit, particularly between drive element 8b and drive element 20, occurs, output shaft 10 can be released using the decoupling mechanism of decoupling device 6. Output piston 10 can hereby be displaced inside ball spindle 20, constructed as a hollow spindle, whereby the effective length or the distance between the linkage points 5a,b can be adjusted externally by a force applied on actuator element 3. This force can be applied, for example, by a second actuator element arranged in a force-parallel or effect-parallel manner. In the event of the form-fit between drive element 20 and output piston 10 being released, actuator element 3 is essentially freewheeling, while the adjustability of an aerodynamically active surface can be provided using a second, redundant, parallel-arranged actuator.

With further reference to FIGS. 3a-c, an exemplary embodiment of a decoupling device according to the present invention is depicted in a locked, form-fitting state.

FIG. 3a depicts a longitudinal cross-section through an actuator element 3 according to the invention, while FIGS. 3b and 3c depict cross-sections through planes BB and CC.

FIG. 3a depicts a decoupling device 6 with a drive unit, having a ball spindle 20, which is displaced upward and downward by a rotating ball nut not depicted in FIG. 3a. Ball spindle 20 is designed as a hollow spindle and accommodates output piston 10 inside. The sole linkage between ball spindle 20 and output piston 10 is the decoupling mechanism of decoupling device 6. The decoupling mechanism has form-fitting elements, designed for example purposes as six ball elements 31a-f, which provide a form-fitting connection and thus a force transfer between ball spindle 20 and output piston 10. In FIG. 3a, form-fitting elements 31a-f are arranged in recesses 67 of output piston 10 and simultaneously mounted in adapter element 32, which is rigidly connected to ball spindle 20. In this way, a force transfer results between output piston 10 via form-fitting elements 31a-f to adapter element 32 and via this to ball spindle 20. A translation of ball spindle 20 based on the rotation of the spindle nut, in FIG. 3a upward and downward, thus results directly in a comparable movement of output piston 10. In a form-fitted state of decoupling device 6 according to FIGS. 3a-c, form-fitting elements 31a-f thus grasp into recesses 67 of output piston 10. Form-fitting elements 31a-f are held there by a locking sleeve 33, which in its arrangement according to FIGS. 3a-c, presses form-fitting elements 31a-f into recesses 67 of output piston 10 and keeps them there. Locking sleeve 33 also has recesses 33a-f, which accommodate form-fitting elements 31a-f and loosen the form-fit by the sliding of form-fitting elements 31a-f out of recesses 67 of output piston 10. The state of the opened form-fit is portrayed below by referring to FIGS. 4a-c.

Locking sleeve 33 is, using drive element 50 and if applicable a suitable translation, twistable or rotatable and thus transferable between a position in which form-fitting elements 31a-f are pressed into recesses 67 of output piston 10, and a position in which recesses 33a-f are arranged in such a manner that form-fitting elements 31a-f can slide out of recesses 67 of output piston 10. Locking sleeve 33 thus retains form-fitting elements 31a-f in the first position in the form-fit.

Two rotation sealing elements 34a,b, two disk elements 35a,b and two covers 36a,b are provided and connected to locking sleeve 33 and together result in the sleeve arrangement. Locking sleeve 33 and pivoting sleeve 41 are connected to each other by a shaft-hub connection 42, which restricts the relative freedom of rotation, yet allows a relative axial movement between output piston 10, spindle 20, adapter element 32, form-fitting elements 31a-f and sleeve arrangement on the one hand, and drive element 50, gear element 40 including gear wheels 43, pivoting sleeve 41, bearings 45a,b and housing 44a,b on the other. In the form-fitting state of decoupling device 6, the sleeve arrangement shifts inside pivoting sleeve 41, which is held inside housing 44a,b by roller bearings 45a,b. In an advantageous design of the invention, drive element 50, gear element 40 including gear wheels 43, pivoting sleeve 41, bearing 45a,b and housing 44a,b may be fixed in a translational manner to linkage point 5a and thus for example to the fuselage of the aircraft. The same applies also for all required connections, particularly electrical power and sensor connections between the decoupling device and the fuselage.

With further reference to FIGS. 4a-c, an exemplary embodiment of the unlocking device according to the present invention in an open state is depicted.

To decouple decoupling device 6, thus to open the form fit, drive element 50, for example an electric motor or alternatively a duplex-electric motor with two redundant motor elements on a motor shaft, is supplied with operating power. The resulting rotation of drive element 50 can be intensified, for example, by a two-stage spur gear 40 or alternatively by a single- or multi-stage planetary gear or a combination of planetary and spur gear stages or another suitable gear mechanism. Gear wheel 43 of the second reduction stage is connected to pivoting sleeve 41, which transmits the rotation to the sleeve arrangement. When a certain force, applied by drive unit 50, is reached or exceeded, the resistance of the form fit, the static friction of the rotation sealing element 34a,b and the static friction between locking sleeve 33 and form-fitting elements 31a-f is overcome. Drive element 50 thus pivots gear wheel 43 from the position depicted in FIG. 3c into the position depicted in FIG. 4c, whereby recesses 33a-f are arranged in the region of form-fitting elements 31a-31f and these can slide out of recesses 67 of output shaft 10. Ball elements 31a-f are thus unblocked by the movement of the sleeve arrangement. In doing so, gear wheel 43 may be in contact with the housing wall, as depicted in FIG. 4c, which may simultaneously represent an end position by contacting the housing. Such regions in the housing may be lined by a damping material, such as silicone gel for example.

In regard to a released form-fit according to FIGS. 4a-c, external forces can now press on the actuator arrangement of form-fitting elements 31a-f outwardly in a radial direction into recesses 33a-f of locking sleeve 33. Elastic C-rings 37a-f may be provided inside the openings of adapter element 32 for decelerating the movement of form-fitting elements 31a-f C-rings 37a-f may apply a certain force on form-fitting elements 31a-f, whereby these are maintained in position and in particular can no longer slide back automatically into recesses 67 of output piston 10. Sleeves 38a-f may hold the C-rings in the holes (not labeled) of adapter element 32, whereby sleeve 39 may provide an axial support in an overhang region of the sleeve arrangement in a decoupled state. By means of the released form-fit, a force transfer of the drive unit on to output piston 10 is prevented; instead, output piston 10 can be displaced inside ball spindle 20 designed as a hollow spindle so that actuator element 3 runs freely or can have its length changed by a force acting from the outside. After decoupling, form-fitting elements 31a-f may be held by C-rings 37a-f, sleeves 38a-f and sleeve 39 in recesses 33a-f of locking sleeve 33.

Such a decoupling may now take place within the scope of a regular test prior to a flight to ensure that decoupling device 6 functions properly in the event of a malfunction. Decoupling device 6 according to the invention thereby allows decoupling under load.

After decoupling has occurred, now the length of actuator element 3 can be adjusted from the outside, for example by a redundant actuator element arranged in parallel. The externally acting length change thereby displaces output piston 10 inside ball spindle 20.

To allow coupling of the decoupling device after a possible test, the position of output piston 10 may be adjusted using the redundant, parallel-arranged actuator element in such a manner that recesses 67 in output piston 10 are arranged in the region of form-fitting elements 31a-f. Drive element 50 may now displace locking sleeve 30 in the opposite direction, thus from a position as depicted in FIG. 4c into a position as depicted in FIG. 3c. Form-fitting elements 31a-f are hereby displaced out of recesses 33a-f of locking sleeve 33 back into recesses 67 of output piston 10. Locking sleeve 33 secures form-fitting elements 31a-f in recesses 67 of output piston 10 and thereby restores the form-fitting state. Output piston 10 and/or ball spindle 20 can be secured by suitable means against a relative rotation, for example by a pin in a recess.

A preferred embodiment of decoupling device 6 according to the invention uses a suitable lubrication, for example oil, grease or similar in the region of form-fitting elements 31a-f. To do so, rod seals 11a,b can be provided, which keep the lubricant in the lubricant space, particularly for only a defined axial relative motion between output piston 10 and ball spindle 20. Particularly during a test, the axial motion after decoupling may be smaller than a defined limit, which is determined by rod seals 11a,b, since otherwise a re-lubrication of decoupling device 6 may be necessary. In the event of a mechanical defect, it may be irrelevant whether the lubricant leaves the assigned space, since after an actually occurring defect, actuator element 3 must be replaced and overhauled on a regular basis.

Alternatively, the complete space inside the housing of actuator element 3 may be filled with a lubricant, for example synthetic oil. In this case, sealing elements 11a,b, 34a,b may be dispensed with. Alternatively, permanent lubrication solutions are conceivable as well as suitable coatings.

By a suitable lubrication, less wear as well as a longer service life of the mechanical components as well as a low actuating force may result. Each component in the actuator element according to the invention may be individually lubricated, for example the unlocking device, the ball screw drive, or alternatively a planetary roller screw drive, and a possibly provided gear. By splitting up and limiting the individual lubrication volumes, a subsequent fault transfer, for example micrometallic particles of the gear that trigger a defect in the ball screw drive, can be avoided. Lubricants may also diminish a rapid movement of the form-fitting elements, particularly during the decoupling process.

The decoupling device according to the invention is thereby advantageously attached rigidly in or on the housing of the electromechanical actuator element, whereby a robust and reliable energy transfer by mechanical components is provided from a fixed position to the moving components of the drive unit. By means of the mechanical transmission, flexible cables, which are possibly subject to premature ageing, may be dispensed with.

With additional reference to FIG. 5, an exemplary embodiment of an actuator arrangement according to the present invention is depicted.

FIG. 5 depicts an embodiment for example purposes of the controller of a swashplate of a helicopter, with three actuator arrangements 70 arranged between the aircraft structure 72a and an aerodynamically active element 72b. Aerodynamically active element 72b, the swashplate of a helicopter, thereby allows the stationary and cyclic influencing of the angle of attack of the rotor blades so that the helicopter may assume a movement direction corresponding to the control. Swashplate 72b is thus supposed to be adjustable in three axes of freedom, wherefore these are essentially controlled freely by three actuator arrangements 70. Each actuator arrangement 70 has in turn two actuator elements 3, which are arranged in a force-parallel or effect-parallel manner. The adjustment of the effective lengths of the actuator arrangement 70 can thus be executed by both actuator elements 3 simultaneously or also by only one single actuator element 3.

In the event of a malfunction, in which for example an actuator element 3 of an actuator arrangement 70 has a defect, a decoupling device according to the invention decouples the drive unit of the defective actuator element 3, so that the length change of actuator arrangement 70 can be provided solely by the non-defective actuator element 3 of an actuator arrangement 70. In the event of a malfunction, i.e., in the case of a defect of an actuator element 3, the functioning of actuator arrangement 70 can hereby be fully assured and thereby the ability to position swashplate 72b in its 3 degrees of freedom. In the event of a test of actuator arrangement 70, one of the actuator elements 3 can be decoupled, while the length change of corresponding actuator element 3 can be provided by the effect-parallel or force-parallel arrangement of the non-decoupled actuator element. Even after decoupling of an actuator element 3 is complete, the second, non-decoupled actuator element can enable a position or length of the decoupled actuator element to be adjusted that allows a re-coupling of the decoupled actuator element 3.

In doing so, a general aspect of the present invention is that the decoupling device according to the invention is constructed in such a manner that the form-fitting elements and the retaining element move translationally with output piston 10 and linkage point 5b, but that pivoting sleeve 41 ensures that drive unit 50 and gear 40 do not move translationally or rotationally relative to linkage point 5a. Pivoting sleeve 41 thereby transmits the pivot movement from gear 40 translationally fixed to linkage point 5a and the gear unit of decoupling device 50 to form-fitting elements 31, fixed translationally to the spindle as well as in a coupled state of decoupling device 6 also to output piston 10 and linkage point 5b, and sleeve arrangement 33, 34a,b, 35a,b, 36a,b.

Since motor element 1, force transmission element 2a-c, and the second drive element 8b of the element according to FIG. 2 are also fixed translationally to linkage point 5a and this may also be preferred for any sensor systems, particularly to determine force, rotational and translational position as well as temperature, all electrical connections between the actuated element and associated control units in the stationary system may run to linkage point 5a and must not compensate a rotational and/or translational relative motion between an actuated element, for example an aerodynamically active surface, and the fuselage of the aircraft.

Such relative movements may otherwise be taken into consideration in the design of an associated cable harness and would thereby result in additional complexity, costs, and potentially reduced reliability. FIGS. 3a-c as well as FIGS. 4a-c depict the element in its extended state, in other words for a maximum adjusted distance between linkage points 5a and 5b. In a retracted state of the element, output pistons 10, spindle 20, adapter element 32, form-fitting elements 31a-f, and sleeve arrangement 33, 34a,b, 35a,b, 36a,b would shift up to the lower end of pivoting sleeve 41, while drive element 50, gear element 40 with gear wheels 43, pivoting sleeve 41, bearing 45, and housing 44 would remain stationary.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Motor element
2a,b,c Force transmission
3 Actuator element
5a,b Linkage points
6 Decoupling device
8 Drive unit/ball screw/ball screw drive
8a First drive element/drive spindle/ball spindle
8b Second drive element/spindle nut/ball nut
10 Output piston
11a,b Rod seals
20 Ball spindle/spindle
31a-f Form-fitting elements/ball elements
32 Adapter element
33 Locking sleeve
33a-f Recesses in locking sleeve
34a,b Rotation sealing elements
35a,b Disk elements
36a,b Cover
37a-f C-rings
38a-f Sleeves
39 Sleeve
40 Gear
41 Pivoting sleeve
42 Shaft-hub connection
43 Gear wheel
44a,b Housing
45a,b Roller bearing
50 Drive element/electric motor
67 Recesses in output shaft
70 Actuator arrangement 72a Airframe
72b Aerodynamically active element

What is claimed is:

1. An actuator element, comprising:
   a drive unit, having a first drive element and a second drive element, wherein the first drive element and the second drive element are arranged to functionally interact in such a manner to effect a change in length of the actuator element;
   a decoupling device;
   two linkage points having a span extending from one to the other of the two linkage points, wherein one of the drive elements is connected to one of the two linkage points;
   an output piston connected to the other one of the two linkage points,
   wherein the span of the two linkage points in a coupled state of the decoupling device is adjustable by driving one of the first and second drive element, and
   wherein the span of the two linkage points in a decoupled state of the decoupling device is adjustable by application of an external force on one of the two linkage points,
   wherein the decoupling device comprises
   a motor, a plurality of ball elements, and a sleeve element with recesses,
   wherein the motor is arranged to move the sleeve element between a first position and a second position,
   wherein the sleeve element is coupled with the output piston in the first position by retaining the plurality of ball elements in corresponding recesses in the output piston, and
   wherein the sleeve element is decoupled from the output piston in the second position by accommodating the plurality of ball elements in the recesses of the sleeve element.

2. The actuator element of claim 1, wherein the drive unit is a spindle drive, a ball screw drive, a planetary roller drive, or a trapeze screw drive.

3. The actuator element of claim 2, wherein the first drive element is a hollow spindle and the output piston is arranged inside a hollow space of the hollow spindle.

4. The actuator element of claim 3, wherein
   the output shaft is freely displaceable inside the hollow spindle in the second position of the sleeve element.

5. The actuator element of claim 1, wherein the first drive element and the second drive element are a ball spindle and ball nut of a ball screw drive.

6. The actuator element of claim 5, further comprising:
   a motor element,
   wherein the ball nut is rotatable using the motor element, wherein a translation of the ball spindle changes the length of the actuator element.

7. The actuator element of claim 6, wherein translation of the first drive element causes a translation of the output piston when the sleeve element is in the first position.

8. The actuator element of claim 1, wherein
   the sleeve element is rotatable using the drive unit.

9. The actuator element of claim 1, further comprising:
   a housing; and
   a sealing element arrangement arranged in such a manner that a region of the plurality of ball elements, sleeve element, output piston and housing are constructed in a seal-tight manner and the region is filled with a lubricant.

10. The actuator element of claim 9, further comprising:
    rod seals, wherein the rod seals provide a seal for the lubricant during a test of the actuator element.

11. The actuator element of claim 9, wherein one of the two linkage points is arranged on one end of the housing of the actuator element and the other linkage point is arranged on an external end of the output piston.

12. The actuator element of claim 1, wherein
    the decoupling device is arranged so that it can be decoupled in the course of a test; and
    the decoupling device is arranged so that it can be re-coupled after completion of the test without disassembling the actuator element.

13. The actuator element of claim 1, wherein conductive connections between the decoupling device and an aircraft are provided solely to a stationary part of the decoupling device so that a movement of a movable part of the decoupling device does not require any movability of the conductive connection.

14. An actuator arrangement, comprising:
    at least two actuator elements, each of the at least two actuator elements comprising
    a drive unit, having a first drive element and a second drive element, wherein the first drive element and the second drive element are arranged to functionally interact in such a manner to effect a change in length of the actuator element;
    a decoupling device;
    two linkage points having a span extending from one to the other of the two linkage points, wherein one of the drive elements is connected to one of the two linkage points;
    an output piston connected to the other one of the two linkage points,
    wherein the span of the two linkage points in a coupled state of the decoupling device is adjustable by driving one of the first and second drive element, and
    wherein the span of the two linkage points in a decoupled state of the decoupling device is adjustable by application of an external force on one of the two linkage points,
    wherein the decoupling device comprises
    a motor, a plurality of ball elements, and a sleeve element with recesses,
    wherein the motor is arranged to move the sleeve element between a first position and a second position;
    wherein the sleeve element is coupled with the output piston in the first position by retaining the plurality of ball elements in corresponding recesses in the output piston,
    wherein the sleeve element is decoupled from the output piston in the second position by accommodating the plurality of ball elements in the recesses of the sleeve element, and
    wherein the at least two actuator elements are arranged in a force-parallel manner so that a length change of the actuator arrangement can be effected by one actuator element alone or by both actuator elements at the same time.

15. The actuator arrangement of claim 14, wherein in event of a defect of a drive unit of one of the two actuator elements, the decoupling device triggers the decoupling mechanism of the actuator element having a defect so that the actuator element is functionally decoupled and the length change of the actuator arrangement continues to be affected by the non-decoupled actuator element.

16. An aircraft, comprising:

an aerodynamically active element, which is driven by an actuator element comprising a drive unit, having a first drive element and a second drive element, wherein the first drive element and the second drive element are arranged to functionally interact in such a manner to effect a change in length of the actuator element;

a decoupling device;

two linkage points having a span extending from one to the other of the two linkage points, wherein one of the drive elements is connected to one of the two linkage points;

an output piston connected to the other one of the two linkage points, wherein the span of the two linkage points in a coupled state of the decoupling device is adjustable by driving one of the first and second drive element, and wherein the span of the two linkage points in a decoupled state of the decoupling device is adjustable by application of an external force on one of the two linkage points, wherein the decoupling device comprises a motor, a plurality of ball elements, and a sleeve element with recesses wherein the motor is arranged to move the sleeve element between a first position and a second position, wherein the sleeve element is coupled with the output piston in the first position by retaining the plurality of ball elements in corresponding recesses in the output piston, and wherein the sleeve element is decoupled from the output piston in the second position by accommodating the plurality of ball elements in the recesses of the sleeve element.

17. The aircraft of claim 16, wherein the aircraft is an airplane or helicopter.

* * * * *